United States Patent
Fukuda et al.

(10) Patent No.: US 9,700,839 B2
(45) Date of Patent: Jul. 11, 2017

(54) AIR POLLUTION CONTROL SYSTEM AND AIR POLLUTION CONTROL METHOD

(71) Applicant: MITSUBISHI HITACHI POWER SYSTEMS, LTD., Yokohama-shi, Kanagawa (JP)

(72) Inventors: Toshihiro Fukuda, Tokyo (JP); Seiji Kagawa, Tokyo (JP); Jun Satou, Tokyo (JP); Susumu Okino, Tokyo (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 0 days.

(21) Appl. No.: 14/764,078

(22) PCT Filed: Nov. 18, 2013

(86) PCT No.: PCT/JP2013/081051
§ 371 (c)(1),
(2) Date: Jul. 28, 2015

(87) PCT Pub. No.: WO2014/129030
PCT Pub. Date: Aug. 28, 2014

(65) Prior Publication Data
US 2015/0360174 A1    Dec. 17, 2015

(30) Foreign Application Priority Data
Feb. 25, 2013    (JP) ................................. 2013-035164

(51) Int. Cl.
*B01D 53/50* (2006.01)
*B01D 53/78* (2006.01)
(Continued)

(52) U.S. Cl.
CPC ............ *B01D 53/504* (2013.01); *B01D 1/18* (2013.01); *B01D 53/505* (2013.01); *B01D 53/75* (2013.01);
(Continued)

(58) Field of Classification Search
CPC .... B01D 53/50; B01D 53/501; B01D 53/504; B01D 53/505; B01D 53/75; B01D 53/78; B01D 53/79
See application file for complete search history.

(56) References Cited

U.S. PATENT DOCUMENTS 8,535,626 B1 * 9/2013 Honjo .................... B01D 53/64
422/108
8,715,402 B2 * 5/2014 Ukai ........................ B01D 1/14
423/243.08
(Continued)

FOREIGN PATENT DOCUMENTS

EP    2127728 A1    12/2009
JP    63-200818 A    8/1988
(Continued)

OTHER PUBLICATIONS

Office Action dated Feb. 5, 2016, issued in counterpart Japanese Patent Application No. 2013-035164, with English translation. (10 pages).
(Continued)

*Primary Examiner* — Timothy Vanoy
(74) *Attorney, Agent, or Firm* — Westerman, Hattori, Daniels & Adrian, LLP

(57) ABSTRACT

Provided is an air pollution control system including: a denitration apparatus; an air heater; a precipitator; a desulfurization apparatus; a dehydrator; a spray drying apparatus provided with a spray unit that is configured to spray dehydrated filtrate as desulfurization wastewater supplied from the dehydrator; a flue gas introduction line through which a branch gas branched from the flue gas is introduced to the spray drying apparatus; a flue gas supply line through which flue gas returns to a main flue gas duct, the flue gas being obtained after the dehydrated filtrate is dried by the spray drying apparatus; and a powder supply apparatus that is configured to supply a powder to the flue gas introduction line.

5 Claims, 7 Drawing Sheets

(51) Int. Cl.
 B01D 53/79 (2006.01)
 B01D 1/18 (2006.01)
 B01D 53/75 (2006.01)
 F26B 3/12 (2006.01)
 F23J 15/00 (2006.01)
 F23J 15/04 (2006.01)
 F23L 11/00 (2006.01)
 F23L 15/04 (2006.01)
 B01D 53/86 (2006.01)

(52) U.S. Cl.
 CPC ........... *B01D 53/78* (2013.01); *F23J 15/003* (2013.01); *F23J 15/04* (2013.01); *F23L 11/00* (2013.01); *F23L 15/04* (2013.01); *F26B 3/12* (2013.01); *B01D 53/8625* (2013.01); *B01D 2251/2062* (2013.01); *B01D 2251/2067* (2013.01); *B01D 2251/404* (2013.01); *B01D 2257/602* (2013.01); *B01D 2258/0283* (2013.01); *B01D 2259/65* (2013.01); *F23J 2215/10* (2013.01); *F23J 2215/20* (2013.01); *F23J 2219/40* (2013.01); *Y02E 20/348* (2013.01); *Y02P 70/34* (2015.11); *Y02P 70/40* (2015.11)

(56) References Cited

U.S. PATENT DOCUMENTS

| 8,883,099 | B2* | 11/2014 | Sjostrom | B01D 53/64 210/198.1 |
| 9,409,123 | B2* | 8/2016 | Sjostrom | B01D 53/64 |
| 2012/0240761 | A1* | 9/2012 | Ukai | B01D 1/14 95/16 |
| 2013/0248121 | A1* | 9/2013 | Ukai | B01D 53/504 159/4.02 |
| 2014/0083629 | A1* | 3/2014 | Fukuda | C02F 1/048 159/4.02 |
| 2016/0214027 | A1* | 7/2016 | Fukuda | C02F 1/048 |

FOREIGN PATENT DOCUMENTS

| JP | 9-313881 A | | 12/1997 | |
| JP | 2001179047 A | * | 7/2001 | ............ B01D 53/34 |
| JP | 2002-204925 A | | 7/2002 | |
| JP | 2007-21442 A | | 2/2007 | |
| JP | 2008-212891 A | | 9/2008 | |
| JP | 2010-227749 A | | 10/2010 | |
| JP | 2011-110480 A | | 6/2011 | |
| JP | 2001-179047 A | | 7/2011 | |
| JP | 2012-196638 A | | 10/2012 | |
| WO | 2008/078722 A1 | | 7/2008 | |

OTHER PUBLICATIONS

Decision to Grant dated Jul. 5, 2016, issued in Japanese Patent Application No. 2013-035164, with English ranslation. (5 pages).
English Translation of Written Opinion dated Feb. 10, 2014, issued in counterpart International Application No. PCT/JP2013/081051. (8 pages).
Search Report dated Dec. 8, 2015, issued in counterpart European Application No. 13875542.6-1351 (8 pages).
International Search Report dated Feb. 10, 2014, issued in counterpart application No. PCT/JP2013/081051 (4 pages).
Written Opinion dated Feb. 10, 2014, issued in counterpart application No. PCT/JP2013/081051 (5 pages).

* cited by examiner

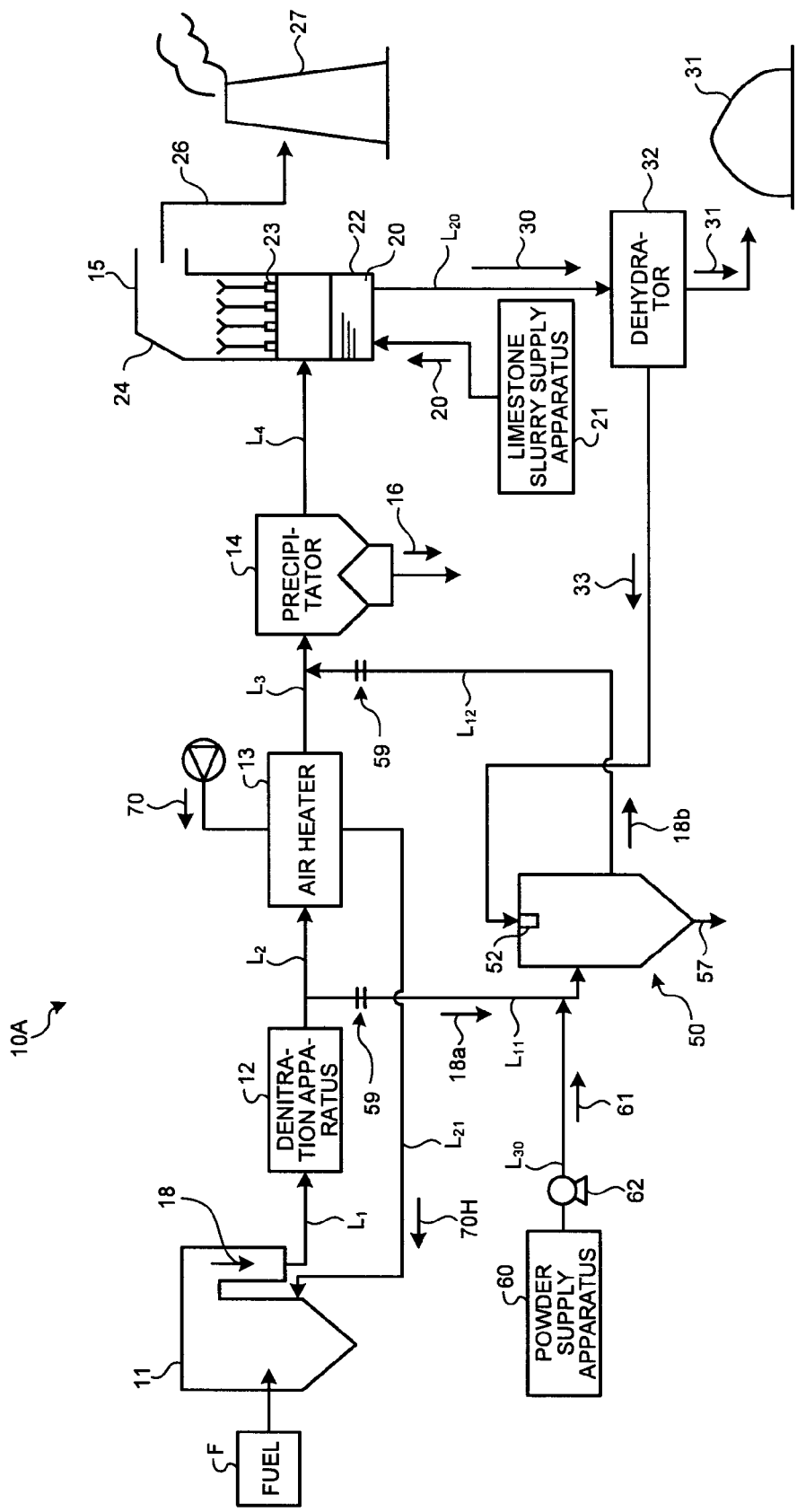

AIR POLLUTION CONTROL SYSTEM AND AIR POLLUTION CONTROL METHOD

FIELD

The present invention relates to an air pollution control system and an air pollution control method for treating a flue gas discharged from a boiler.

BACKGROUND

In the past, there has been known an air pollution control system that treats a flue gas discharged from a boiler installed in a thermal power facility or the like. The air pollution control system includes a denitration apparatus that removes nitrogen oxides from the flue gas discharged from the boiler, an air heater that recovers heat of the flue gas having passed through the denitration device, a precipitator that removes soot and dust contained in the flue gas after heat recovery, and a desulfurization apparatus that removes sulfur oxides contained in the flue gas after dust removal. As the desulfurization apparatus, a wet desulfurization apparatus is generally used, which removes sulfur oxides contained in a flue gas by bringing a limestone absorbent or the like into gas-liquid contact with the flue gas.

Recently, due to enhancement of wastewater regulation, elimination of wastewater in an air pollution control facility has been earnestly desired and an advent of an air pollution control facility for achieving the elimination of wastewater has been earnestly desired in which an operation can be stably performed.

As a facility for performing the elimination of wastewater, the applicant has previously proposed a technique in which a spray drying apparatus is used to dry dehydrated filtrate obtained by separating gypsum from desulfurization wastewater and the desulfurization wastewater is spray-dried using a boiler flue gas (Patent Literature 1).

CITATION LIST

Patent Literature

Patent Literature 1: Japanese Laid-open Patent Publication No. 2012-196638

SUMMARY

Technical Problem

Meanwhile, an $SO_3$ gas is contained in the flue gas. In particular, a high concentration of $SO_3$ gas is contained in a flue gas of a coal combustion boiler in which a fuel containing a high content of sulfur (S) is used as a fuel. At this time, in a spray drying apparatus for spray-drying using a branch gas branched from a main flue gas duct, since the temperature of the flue gas is lowered and the water concentration increases in conjunction with evaporation of sprayed droplets, there is a possibility that the $SO_3$ gas reaches a dew point and is thus condensed.

The condensed $SO_3$ flies in the equipment on the rear stream side of the spray drying apparatus in the form of a sulfuric acid mist. At this time, since the branch gas used in the spray drying apparatus returns to the main flue gas duct once again, when the sulfuric acid mist adheres to, for example, an internal component, duct, or rear-stream equipment of the spray drying apparatus, and an internal component of the duct, there is a possibility that the corrosion or blockage occurs.

In addition, even when a precipitator or an absorber is installed on the rear stream side of the spray drying apparatus, there is a possibility that the sulfuric acid mist having a fine particle size is released to the atmosphere without being collected.

Therefore, an advent of an air pollution control system is earnestly desired which can efficiently collect a sulfuric acid mist to be generated at the time of performing the elimination of wastewater on the desulfurization wastewater from the desulfurization apparatus.

The present invention has been made in view of the above problems and an object thereof is to provide an air pollution control system and an air pollution control method which efficiently collect a sulfuric acid mist to be generated at the time of spray-drying.

Solution to Problem

According to a first aspect of the present invention in order to solve the above problems, there is provided an air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a dehydrator that is configured to remove gypsum from absorber slurry discharged from the desulfurization apparatus; a spray drying apparatus that is provided with a spray unit which is configured to spray dehydrated filtrate supplied from the dehydrator; a flue gas introduction line through which some of a branch gas branched from the flue gas is introduced to the spray drying apparatus from a main flue gas duct; a flue gas supply line through which a flue gas returns to the main flue gas duct, the flue gas being obtained after the dehydrated filtrate is dried by the spray drying apparatus; and a powder supply apparatus that is configured to supply a powder to the flue gas introduction line.

According to a second aspect of the present invention, there is provided the air pollution control system according to the first aspect, wherein the powder is either or both of collected dust ash collected by the precipitator or a powder which is separately charged.

According to a third aspect of the present invention, there is provided an air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a dehydrator that is configured to remove gypsum from absorber slurry discharged from the desulfurization apparatus; a spray drying apparatus that is provided with a spray unit which is configured to spray dehydrated filtrate supplied from the dehydrator; a flue gas introduction line through which some of a branch gas branched from the flue gas is introduced to the spray drying apparatus from a main flue gas duct; a flue gas supply line through which a flue gas returns to the main flue gas duct, the flue gas being obtained after the dehydrated filtrate is dried by the spray drying apparatus; and a soot and dust supply unit that is configured to forcedly supply soot and dust contained in the flue gas to the flue gas introduction line.

According to a fourth aspect of the present invention, there is provided an air pollution control method in which after heat of a flue gas discharged from a boiler configured to combust a fuel is recovered by an air heater, sulfur oxides contained in the flue gas after heat recovery are removed using an absorbent in a desulfurization apparatus, the method including: introducing a branch gas into a spray drying apparatus while increasing the amount of dust into the branch gas; performing spray-drying with a gas including a large amount of dust; and collecting a sulfuric acid mist to be generated.

Advantageous Effects of Invention

According to the present invention, the amount of powder is increased in a branch gas which is branched from a flue gas for drying desulfurization wastewater such that a sulfuric acid mist to be generated at the time of a spray drying treatment adheres to the powder, and thus it is possible to collect the sulfuric acid mist.

BRIEF DESCRIPTION OF DRAWINGS

FIG. 1 is a schematic configuration diagram of an air pollution control system according to a first embodiment.

FIG. 6-1 is a schematic diagram of a distribution unit according to a fifth embodiment.

FIG. 6-2 is a side view of the distribution unit according to the fifth embodiment.

FIG. 6-3 is a front view of the distribution unit according to the fifth embodiment.

FIG. 6-4 is a plan view of the distribution unit according to the fifth embodiment.

DESCRIPTION OF EMBODIMENTS

Preferred embodiments of the invention will be described in detail below with reference to the accompanying drawings. Meanwhile, the invention is not limited by these embodiments. Further, when the invention includes a plurality of embodiments, the invention also includes the combination of the respective embodiments.

First Embodiment

Figure 2:
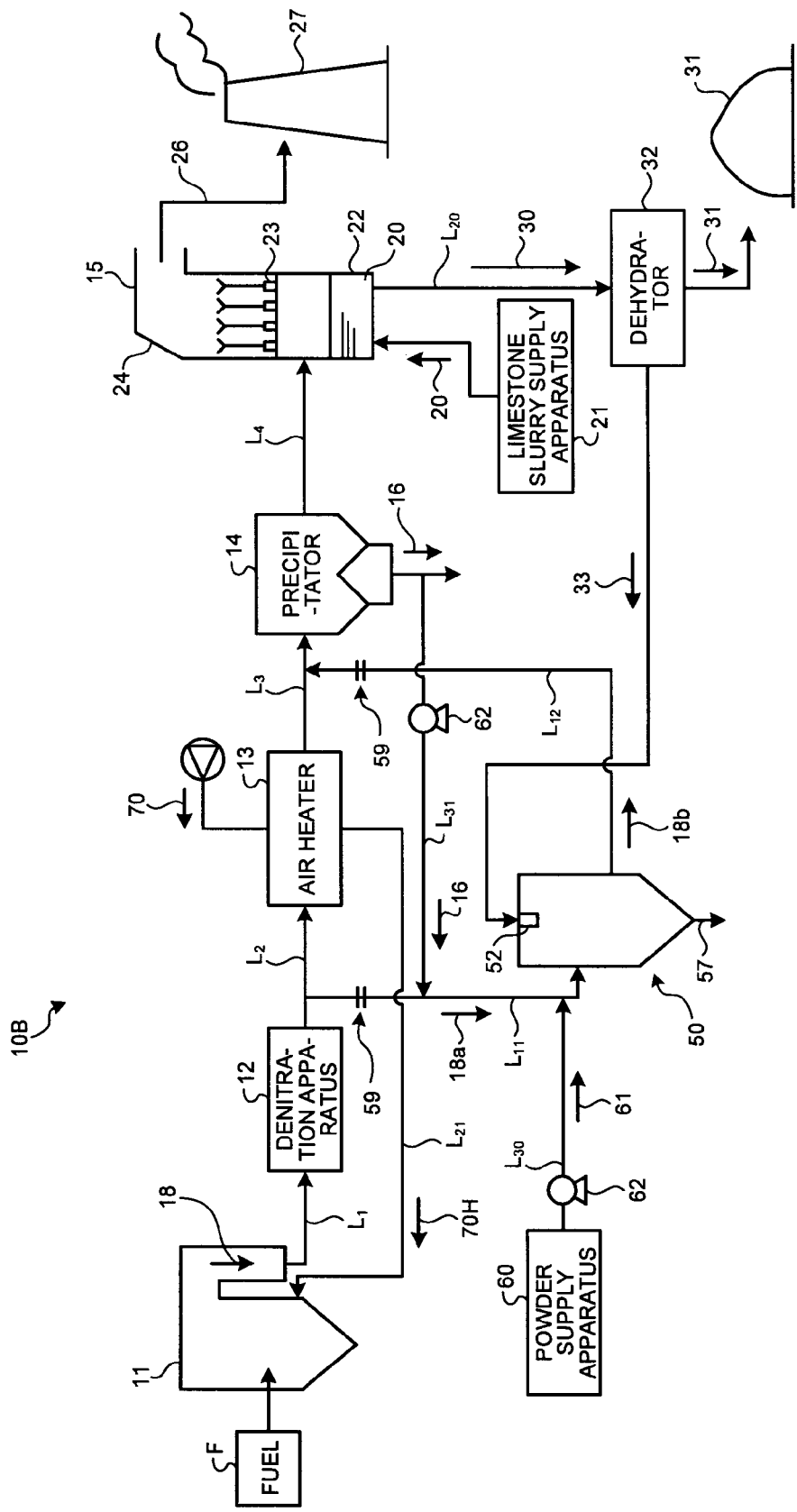
FIG. 2 is a schematic configuration diagram of an air pollution control system according to a second embodiment.
Figure 3:
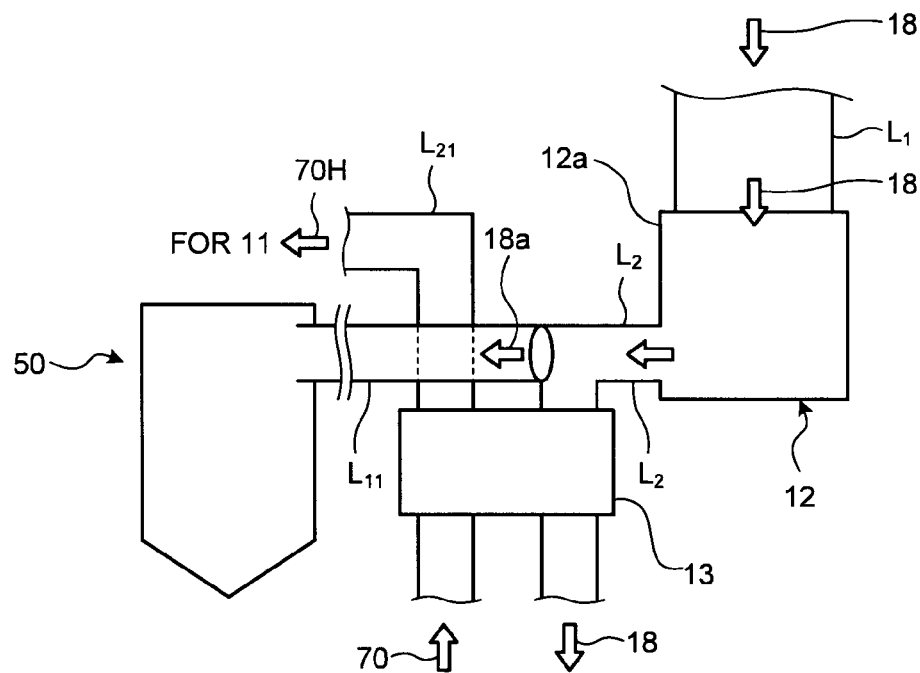
FIG. 3 is a schematic configuration diagram of an air pollution control system according to a third embodiment.
Figure 4:
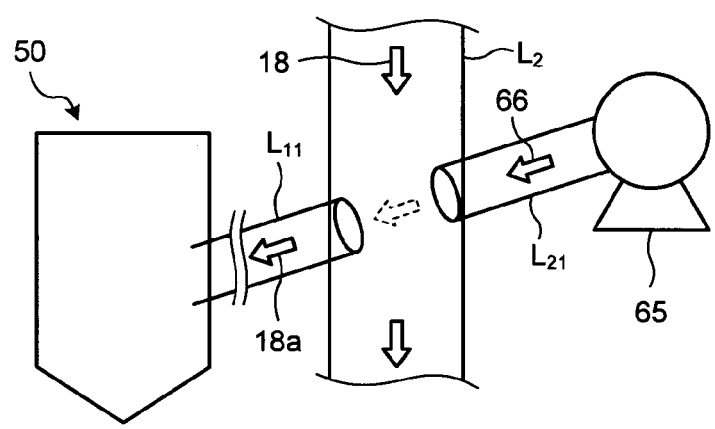
FIG. 4 is a schematic configuration diagram of an air pollution control system according to a fourth embodiment.
Figure 5:
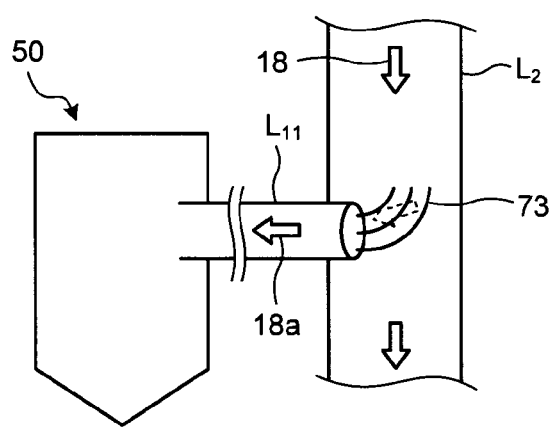
FIG. 5 is a schematic configuration diagram of another air pollution control system according to the fourth embodiment.
Figures 1, 6:
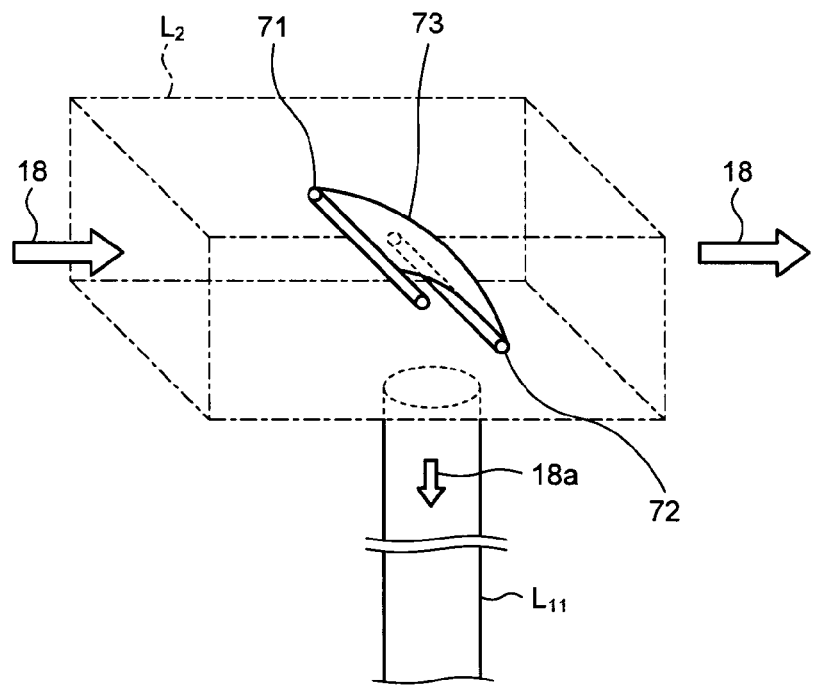
Figures 2, 6:
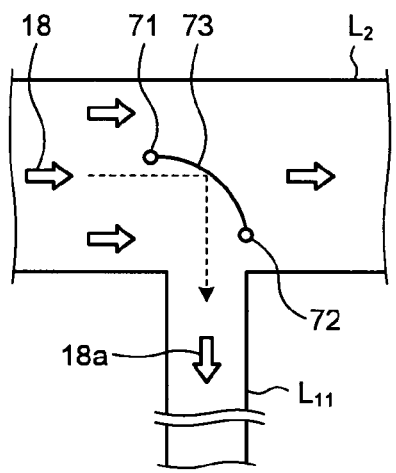
Figures 3, 6:
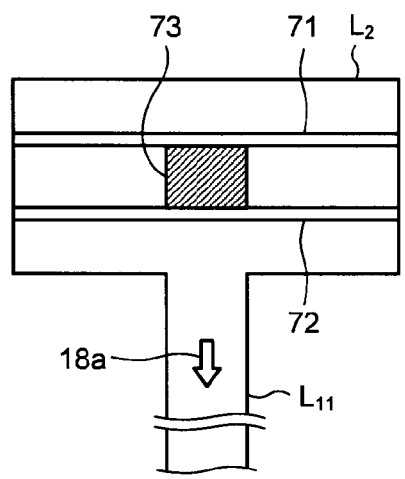
Figures 4, 6:
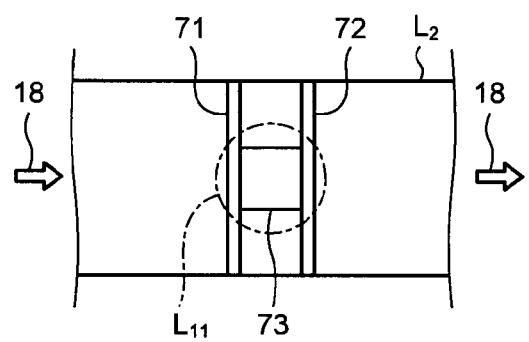

FIG. 1 is a schematic configuration diagram of an air pollution control system according to a first embodiment. An air pollution control system 10A exemplified in FIG. 1 is a plant which removes hazardous substances such as nitrogen oxides ($NO_x$), sulfur oxides ($SO_x$), soot and dust (PM), or mercury (Hg) from boiler flue gas (hereinafter, referred to as "flue gas") 18 discharged from a boiler 11 such as a coal combustion boiler using, for example, coals or residual solid substances as a fuel or an oil combustion boiler using heavy oil or residual oil as a fuel.

The air pollution control system 10A according to the present embodiment includes a boiler 11 that is configured to combust a fuel F, a denitration apparatus 12 that is configured to remove nitrogen oxides in a flue gas 18 discharged from the boiler 11, an air heater 13 that is configured to recover heat of the flue gas 18 after denitration, a precipitator 14 that is configured to remove soot and dust contained in the flue gas 18 after heat recovery in the form of collected dust ash 16, a desulfurization apparatus 15 that is configured to remove sulfur oxides contained in the flue gas 18 after dust removal using limestone slurry 20 which is an absorbent, a dehydrator 32 that is configured to remove gypsum 31 from absorber slurry discharged from the desulfurization apparatus 15, a spray drying apparatus 50 provided with a spray unit that is configured to spray dehydrated filtrate 33 supplied from the dehydrator 32, a flue gas introduction line $L_{11}$ through which a branch gas 18a branched from the flue gas 18 is introduced to the spray drying apparatus 50, a flue gas supply line $L_{12}$ through which flue gas 18b returns to a main flue gas duct, the flue gas 18b being obtained after the dehydrated filtrate 33 is dried by the spray drying apparatus 50, and a powder supply apparatus 60 that is configured to supply a powder 61 to the flue gas introduction line $L_{11}$.

Thus, the powder 61 is supplied into the branch gas 18a to be supplied to the spray drying apparatus 50, so that the concentration of the soot and dust can be increased.

Consequently, the powder 61 adheres to a sulfuric acid mist to be generated when the spray-drying is performed using the branch gas 18a in the spray drying apparatus 50, and thus it is possible to reduce the amount of sulfuric acid mist. Accordingly, it is possible to reduce the amount of sulfuric acid mist contained in the flue gas 18b discharged from the spray drying apparatus 50 and to prevent the corrosion on a rear stream side due to the sulfuric acid mist.

The denitration apparatus 12 is an apparatus that removes nitrogen oxides contained in the flue gas 18 supplied from the boiler 11 through a gas supply line $L_1$ and includes a denitration catalyst layer (not illustrated) therein. A reducing agent injector (not illustrated) is disposed on a front stream side of the denitration catalyst layer, and a reducing agent is injected into the flue gas 18 from the reducing agent injector. Here, for example, ammonia, urea, or ammonium chloride is used as the reducing agent. The nitrogen oxides contained in the flue gas 18 introduced to the denitration apparatus 12 comes into contact with the denitration catalyst layer, so that the nitrogen oxides contained in the flue gas 18 are decomposed into nitrogen gas ($N_2$) and water ($H_2O$) and removed. In addition, as the amount of chlorine (Cl) of the mercury contained in the flue gas 18 increases, the ratio of bivalent mercury chloride soluble in water increases and mercury is easily collected by the desulfurization apparatus 15 to be described below.

Meanwhile, the above-described denitration apparatus 12 is not essential, and when the concentration of the nitrogen oxide or mercury contained in the flue gas 18 discharged from the boiler 11 is low or when these substances are not contained in the flue gas 18, the denitration apparatus 12 may not be provided.

The air heater 13 is a heat exchanger that recovers the heat in the flue gas 18 which is supplied through a flue gas supply line $L_2$ after the nitrogen oxides are removed by the denitration apparatus 12. Since the temperature of the flue gas 18, which has passed through the denitration apparatus 12, is as high as about 300 to 400° C., heat exchange is performed between the high-temperature flue gas 18 and room-temperature combustion air 70 by the air heater 13. Combustion air 70H of which the temperature becomes high by the heat exchange is supplied to the boiler 11 through an air supply line $L_{21}$. Meanwhile, the flue gas 18, which is heat-exchanged with the room-temperature combustion air 70, is cooled to a temperature of about 150° C.

The precipitator 14 is to remove soot and dust contained in the flue gas 18, which is supplied through a gas supply line $L_3$, after the heat recovery at the air heater 13. Examples of the precipitator 14 include an inertial precipitator, a centrifugal precipitator, a filtration-type precipitator, an electronic precipitator, a washing precipitator, but are not particularly limited thereto.

The desulfurization apparatus 15 is an example of an apparatus that removes the sulfur oxides contained in the flue gas 18, which is supplied through a gas supply line $L_4$ after the soot and dust are removed, in a wet manner. For example, limestone slurry (an aqueous solution obtained by dissolving limestone powder in water) 20 is used as an alkaline absorbent in the desulfurization apparatus 15, and a temperature in the apparatus is adjusted to about 30 to 80° C., for example. The limestone slurry 20 is supplied to a liquid reservoir in a column bottom portion 22 of the desulfurization apparatus 15 from a limestone slurry supply apparatus 21. The limestone slurry 20, which is supplied to the column bottom portion 22 of the desulfurization apparatus 15, is fed to a plurality of nozzles 23 provided in the desulfurization apparatus 15 through an absorbent supply line (not illustrated) and is ejected from the nozzles 23 toward a column top portion 24. The flue gas 18 rising from the column bottom portion 22 of the desulfurization apparatus 15 comes into gas-liquid contact with the limestone slurry 20 ejected from the nozzles 23, so that the sulfur oxides and the mercury chlorides contained in the flue gas 18 are absorbed by the limestone slurry 20 and are separated and removed from the flue gas 18. The flue gas 18 purified by the limestone slurry 20 is discharged from the column top portion 24 of the desulfurization apparatus 15 as a purified gas 26 and is discharged from a stack 27 to the outside of the system.

In the interior of the desulfurization apparatus 15, the sulfur oxide $SO_x$ contained in the flue gas 18 reacts with the limestone slurry 20 as represented by the following Formula (1).

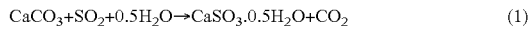

$$CaCO_3+SO_2+0.5H_2O \rightarrow CaSO_3.0.5H_2O+CO_2 \quad (1)$$

In addition, the limestone slurry 20, which has absorbed $SO_x$ contained in the flue gas 18, is oxidized by air (not illustrated) supplied to the column bottom portion 22 of the desulfurization apparatus 15 and reacts with the air as represented by the following Formula (2).

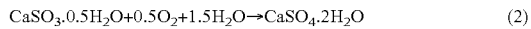

$$CaSO_3.0.5H_2O+0.5O_2+1.5H_2O \rightarrow CaSO_4.2H_2O \quad (2)$$

In this way, the $SO_x$ contained in the flue gas 18 is captured in the form of gypsum $CaSO_4.2H_2O$ in the desulfurization apparatus 15.

In addition, as described above, while a liquid, which is stored in the column bottom portion 22 of the desulfurization apparatus 15 and is pumped up, is used as the limestone slurry 20, the gypsum $CaSO_4.2H_2O$ is mixed with the pumped limestone slurry 20 by Reaction Formulae (1) and (2) with the operation of the desulfurization apparatus 15. In the following description, limestone gypsum slurry (limestone slurry with which the gypsum has been mixed) to be pumped is referred to as an absorbent.

An absorbent 30 as absorber slurry used for desulfurization is discharged to the outside from the column bottom portion 22 of the desulfurization apparatus 15 and is fed to the dehydrator 32 through an absorbent line $L_{20}$ to be dehydrated here. The dehydrated filtrate 33 becomes desulfurization wastewater, but includes heavy metals such as mercury or halogen ions such as $Cl^-$, $Br^-$, $I^-$, and $F^-$.

The dehydrator 32 is to separate a solid component containing the gypsum 31 of the absorbent 30 from a liquid component of the dehydrated filtrate 33. For example, a belt filter, a centrifugal separator, or a decanter-type centrifugal settler is used as the dehydrator 32. The gypsum 31 is separated from the absorbent 30 discharged from the desulfurization apparatus 15, by the dehydrator 32. At this time, mercury chlorides contained in the absorbent 30 are separated from liquid together with the gypsum 31 while being absorbed on the gypsum 31. The separated gypsum 31 is discharged outside of the system (hereinafter, referred to as an "outside of the system").

Meanwhile, the dehydrated filtrate 33, which is a separate liquid from the dehydrator 32, is fed to the spray drying apparatus 50 to be evaporated and dried by the branch gas 18*a* and thus the elimination of wastewater is achieved.

In addition, the spray drying apparatus 50 includes a gas introduction unit to which the branch gas 18*a* branched from the flue gas 18 is introduced through the flue gas introduction line $L_{11}$ branched from the flue gas supply line $L_2$ which is a main flue gas duct of the flue gas 18 supplied from the boiler 11 and a spray unit 52 which is configured to disperse or spray the dehydrated filtrate 33. Then, the dispersed or sprayed dehydrated filtrate 33 is evaporated and dried by heat of the branch gas 18*a* to be introduced. Furthermore, a damper unit 59 is provided on the flue gas introduction line $L_{11}$ and the flue gas supply line $L_{12}$ to stop inflow and discharge of the branch gas 18*a* and the flue gas 18*b*.

In the present embodiment, since the branch gas 18*a* flowing into the air heater 13 is branched from the flue gas supply line $L_2$ through the flue gas introduction line $L_{11}$, the temperature of the gas is high (300 to 400° C.) and the spray-drying of the dehydrated filtrate 33 can be efficiently performed.

Figure 7:
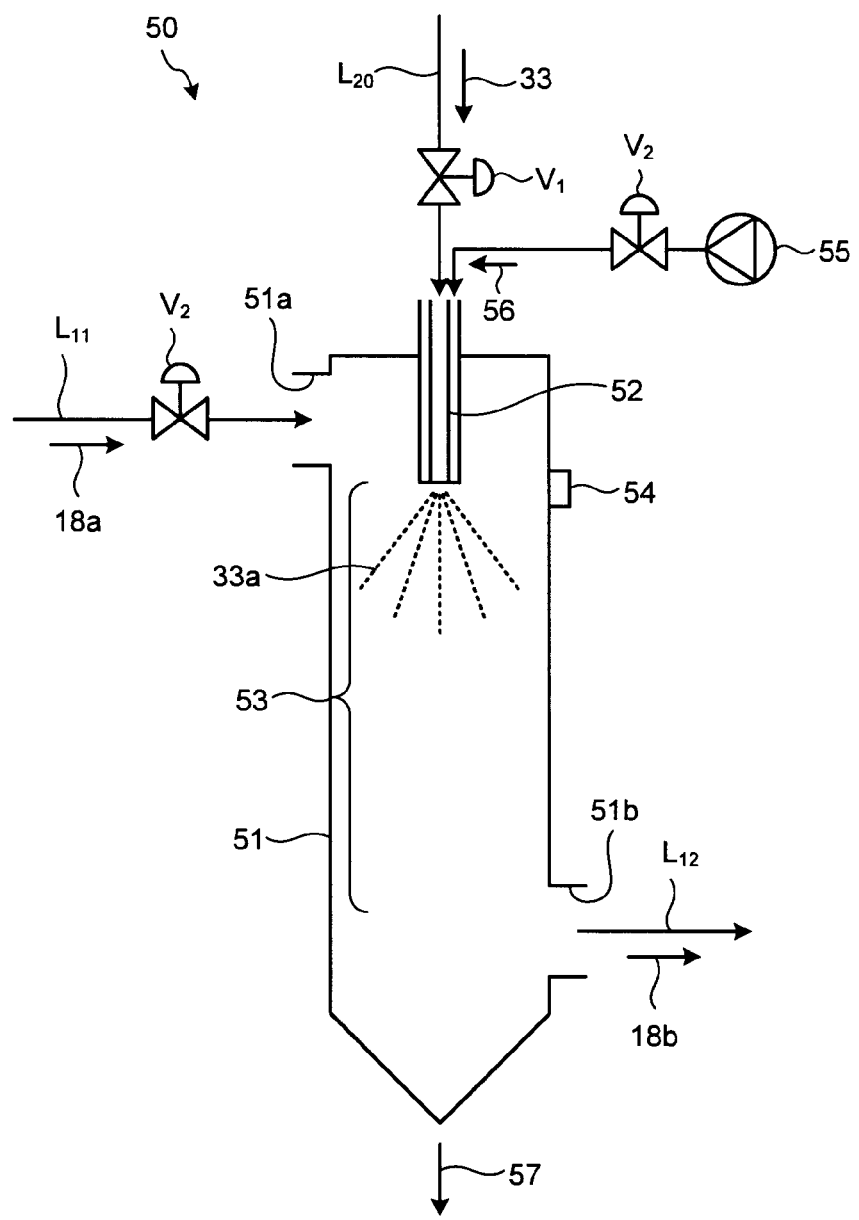
FIG. 7 is a schematic diagram of a spray drying apparatus for a dehydrated filtrate according to the first embodiment.

FIG. 7 is a schematic diagram illustrating an example of the spray drying apparatus for the dehydrated filtrate according to the present embodiment. As illustrated in FIG. 7, the spray drying apparatus 50 according to the present embodiment includes: the spray unit 52 which is provided in a spray drying apparatus body 51 to spray the dehydrated filtrate 33; an inlet 51*a* which is provided in the spray drying apparatus body 51 and is configured to introduce the branch gas 18*a* for drying a spray liquid 33*a*; a drying zone 53 which is provided in the spray drying apparatus body 51 to dry the dehydrated filtrate 33 using the branch gas 18*a*; an outlet 51*b* which discharges the flue gas 18*b* contributed to the drying; and a deposit monitoring unit 54 which monitors a state where a deposit is attached to the spray unit 52. Reference numeral 57 denotes a separated solid matter and reference numerals $V_1$ and $V_2$ denote flow regulating valves.

Incidentally, using the spray unit 52, the dehydrated filtrate 33 is sprayed into the inside of the spray drying apparatus body 51 by air 56 supplied from a compressor 55 at a predetermined flow rate and with a predetermined particle size of sprayed droplets.

Here, as long as the spray unit 52 sprays the dehydrated filtrate 33 in the form of sprayed droplets having a predetermined particle size, the type thereof is not limited. For example, a spray unit such as a two-fluid nozzle or a rotary atomizer may be used. The two-fluid nozzle is suitable to spray a relatively small amount of dehydrated filtrate 33 and the rotary atomizer is suitable to spray a relatively large amount of dehydrated filtrate 33.

In addition, the number of nozzles is not one, and a plurality of nozzles may be provided according to the amount of dehydrated filtrate to be treated.

In the present embodiment, the powder 61 is supplied to the branch gas 18a to be supplied to the spray drying apparatus 50 using a blower 62, so that it is possible to increase the concentration of the soot and dust in the branch gas 18*a*.

Here, for example, those having action of absorbing the limestone used in the desulfurization apparatus 15, soot and dust collected in other plants, or other sulfuric acid mist such as gypsum or activated carbon can be used as the powder 61 to be supplied.

Consequently, when the spray-drying is performed by the spray drying apparatus 50 using the branch gas 18*a*, since the branch gas 18*a* to be introduced into the main body of the spray drying apparatus 50 is accompanied by the powder 61, the sulfuric acid mist to be generated can adhere to the powder 61, resulting in reducing the amount of sulfuric acid mist and preventing the corrosion or the like on the rear stream side due to the sulfuric acid mist. In addition, it is possible to prevent the release of the sulfuric acid mist, which has a fine particle size and is hardly collected, to the atmosphere.

Second Embodiment

FIG. 2 is a schematic configuration diagram of an air pollution control system according to a second embodiment. The same members as those in the air pollution control system according to the first embodiment are denoted by the same reference numerals and the description thereof will not be presented.

As illustrated in FIG. 2, an air pollution control system 10B according to the present embodiment is configured to supply collected dust ash 16, which is collected by a precipitator 14, to a flue gas introduction line $L_{11}$ through a collected dust ash supply line $L_{31}$ using a blower 62.

As a result, the sulfuric acid mist to be generated when spray-drying is performed using the branch gas 18*a* in the spray drying apparatus 50 adheres to a powder 61 and the collected dust ash 16, and thus it is possible to reduce the amount of sulfuric acid mist and to prevent the corrosion or the like on the rear stream side due to the sulfuric acid mist.

Third Embodiment

FIG. 3 is a schematic configuration diagram of an air pollution control system according to a third embodiment. The same members as those in the air pollution control system according to the first embodiment are denoted by the same reference numerals and the description thereof will not be presented.

The spray drying apparatus according to the present embodiment is configured to promote the introduction of a branch gas 18*a* from a boiler 11, which is a main flue gas duct, at a branch portion from a flue gas supply line $L_2$.

In the present embodiment, a flue gas 18 is discharged through the flue gas supply line $L_2$ from a sidewall 12*a* of a denitration apparatus 12. The flue gas supply line $L_2$ is subsequently bent at right angle to allow the flue gas 18 to be introduced into an air heater 13 disposed at a downstream side thereof.

Heat exchange is performed between room-temperature combustion air 70 to be introduced from the outside and the flue gas 18 in the air heater 13, and combustion air 70H of which the temperature becomes high by the heat exchange is supplied to the boiler 11 through an air supply line $L_{21}$.

Then, in the present embodiment, the flue gas supply line $L_2$ extending from the denitration apparatus 12 is connected to a flue gas introduction line $L_{11}$ to be connected without having a bent portion in a straight direction in which the gas flow proceeds such that the branch gas 18*a* goes straight, thereby forming a soot and dust supply unit. The air supply line $L_{21}$ and the flue gas introduction line $L_{11}$ are offset disposed so as not to intersect with each other.

Thus, when the flue gas 18 flows into the branch gas 18*a*, the soot and dust is introduced into the connected flue gas introduction line $L_{11}$ by an inertial thereof, and thus the amount of soot and dust to be fed toward a spray drying apparatus 50 is increased.

Consequently, a larger amount of soot and dust contained in the flue gas 18 is fed to the branch gas 18*a*, and thus the concentration of the soot and dust contained in the branch gas 18*a* can become higher.

Accordingly, a sulfuric acid mist to be generated when spray-drying is performed using the branch gas 18*a* in the spray drying apparatus 50 adheres to a powder 61, and thus it is possible to reduce the amount of sulfuric acid mist and to prevent the corrosion or the like on the rear stream side due to the sulfuric acid mist.

In the present embodiment, when the flue gas 18 is branched, the introduction of the branch gas 18*a* is promoted at the branch portion and the large amount of soot and dust contained in the flue gas is forcedly fed, thereby increasing the amount of soot and dust contained in the branch gas 18*a*. However, the present embodiment may be configured to use together with the manner of the first or second embodiment in which the separate powder 61 or collected dust ash 16 is introduced through a supply line $L_{30}$ from a powder supply apparatus 60.

Fourth Embodiment

FIG. 4 is a schematic configuration diagram of an air pollution control system according to a fourth embodiment. The same members as those in the air pollution control system according to the first embodiment are denoted by the same reference numerals and the description thereof will not be presented.

The spray drying apparatus according to the present embodiment is configured to promote the introduction of a branch gas 18*a* from a boiler 11, which is a main flue gas duct, at a branch portion from a flue gas supply line $L_2$.

In the present embodiment, air 66 is introduced from an air supply line $L_{21}$ by a pushing blower 65, thereby forming a soot and dust supply unit from the boiler 11 to the gas supply line $L_2$.

An opening of the air supply line $L_{21}$ on a pushing blower 65 side and an opening of a flue gas introduction line $L_{11}$ are formed to face each other in a flue gas duct, and the soot and dust contained in the flue gas 18 is forcedly pushed toward the branch gas 18*a* by the pushed air 66 due to the pushing blower 65. As a result, the large amount of soot and dust contained in the flue gas 18 is fed toward a spray drying apparatus 50 by pushing force thereof.

Consequently, the larger amount of soot and dust contained in the flue gas 18 is fed to the branch gas 18*a*, and thus the concentration of the soot and dust contained in the branch gas 18*a* can become higher.

As a result, the sulfuric acid mist to be generated when spray-drying is performed using the branch gas 18a in the spray drying apparatus 50 adheres to a powder 61, and thus it is possible to reduce the amount of sulfuric acid mist and to prevent the corrosion or the like on the rear stream side due to the sulfuric acid mist. In addition, it is possible to prevent the release of the sulfuric acid mist, which has a fine particle size and is hardly collected, to the atmosphere.

In addition, the air supply line $L_{21}$ on the pushing blower 65 side is obliquely placed on the upstream side and the flue gas introduction line $L_{11}$ is obliquely placed on the downstream side, so that it prevents the soot and dust from being introduced toward the pushing blower 65.

In the present embodiment, when the flue gas 18 is branched, the introduction of the branch gas 18*a* is promoted at the branch portion and the ratio of the amount of soot and dust contained in the branch gas 18*a* is increased. However, the present embodiment may be configured to use together with the manner of the first or second embodiment in which the separate powder 61 or collected dust ash 16 is introduced from a powder supply apparatus 60.

Fifth Embodiment

FIG. 5 is a schematic configuration diagram of an air pollution control system according to a fifth embodiment. The same members as those in the air pollution control system according to the first embodiment are denoted by the same reference numerals and the description thereof will not be presented.

The spray drying apparatus according to the present embodiment is configured to promote the introduction of a branch gas 18*a* from a boiler 11, which is a main flue gas duct, at a branch portion from a gas supply line $L_2$.

In the present embodiment, a curved guide vane 73 is installed from the boiler 11 to the flue gas supply line $L_2$ such that some of flue gas is introduced toward a flue gas introduction line $L_{11}$ by a guide of the guide vane 73 while intactly retaining the amount of dust, thereby forming a soot and dust supply unit.

An installation state of the guide vane will be described with reference to FIGS. 6-1 to 6-4. FIG. 6-1 is a schematic diagram of a distribution unit according to the fifth embodiment. FIG. 6-2 is a side view of the distribution unit according to the fifth embodiment. FIG. 6-3 is a front view of the distribution unit according to the fifth embodiment. FIG. 6-4 is a plan view of the distribution unit according to the fifth embodiment.

One guide vane 73 is illustrated in FIGS. 6-1 to 6-4 for the description, but at least three guide vanes are preferably formed as illustrated in FIG. 5.

The guide vane 73 is supported by support rods 71 and 72 disposed in sidewalls of a flue gas duct of the flue gas supply line $L_2$ with a predetermined distance.

Thus, the soot and dust contained in a flue gas 18 is forcedly pushed toward the branch gas 18*a*, and thus the concentration of the soot and dust contained in the flue gas 18 becomes higher.

As a result, the sulfuric acid mist to be generated when spray-drying is performed using the branch gas 18*a* in a spray drying apparatus 50 adheres to a powder 61, and thus it is possible to reduce the amount of sulfuric acid mist and to prevent the corrosion or the like on the rear stream side due to the sulfuric acid mist. In addition, it is possible to prevent the release of the sulfuric acid mist, which has a fine particle size and is hardly collected, to the atmosphere.

In the present embodiment, when the flue gas 18 is branched, the introduction of the branch gas 18*a* is promoted at the branch portion and the large amount of soot and dust contained in the flue gas 18 is fed, thereby increasing the ratio of the amount of soot and dust contained in the branch gas 18*a*. However, the present embodiment may be configured to use together with the manner of the first or second embodiment in which the separate powder 61 or a collected dust ash 16 is introduced from a powder supply apparatus 60.

REFERENCE SIGNS LIST

10A, 10B Air pollution control system
11 Boiler
12 Denitration apparatus
13 Air heater
14 Precipitator
15 Desulfurization apparatus
16 Collected dust ash
18 Flue gas
32 Dehydrator
33 Dehydrated filtrate

The invention claimed is:

1. An air pollution control system comprising:

an air heater that is configured to recover heat of a flue gas after combustion;

a precipitator that is configured to remove soot and dust contained in the flue gas after heat recovery;

a desulfurization apparatus that is configured to remove sulfur oxides contained in the flue gas after dust removal, using an absorbent;

a dehydrator that is configured to remove gypsum from absorber slurry discharged from the desulfurization apparatus;

a spray drying apparatus that is provided with a spray unit which is configured to spray dehydrated filtrate supplied from the dehydrator;

a flue gas introduction line that is connected between a main flue gas duct and the spray drying apparatus and is configured to branch some of the flue gas flowing through the main flue gas duct to be introduced to the spray drying apparatus;

a flue gas supply line that is connected between the spray drying apparatus and the main flue gas duct at a downstream side of where the flue gas introduction line branched therefrom and is configured to return the flue gas obtained after the dehydrated filtrate is dried by the spray drying apparatus to the main flue gas duct; and a soot and dust supply unit that is configured to forcedly supply soot and dust contained in the flue gas to the flue gas introduction line.

2. The air pollution control system according to claim 1, the soot and dust supply unit is configured that the main flue gas duct extending from a denitration apparatus is connected to the flue gas introduction line without having a bent portion such that gas flow of some of the flue gas from the main flue gas duct to the flue gas introduction line proceeds straight.

3. The air pollution control system according to claim 1, wherein the soot and dust supply unit is configured that an opening of an air supply line provided with a pushing blower and an opening of the flue gas introduction line are faced with each other in the main flue gas duct extending from a denitration apparatus such that some of the flue gas is forcedly pushed toward the flue gas introduction line by pushed air due to the pushing blower.

4. The air pollution control system according to claim 1, wherein the soot and dust supply unit is configured that a guide vane is provided in the main flue gas duct extending from a denitration apparatus such that some of the flue gas is introduced toward the flue gas introduction line by a guide of the guide vane.

5. An air pollution control method comprising:
- recovering heat of a flue gas after combustion by an air heater;
- removing sulfur oxides contained in the flue gas after heat recovery using an absorbent in a desulfurization apparatus;
- introducing a branch gas into a spray drying apparatus while forcedly supplying soot and dust to the branch gas;
- performing spray-drying with the branch gas including the soot and dust; and
- collecting a sulfuric acid mist to be generated.

* * * * *